United States Patent
Lim et al.

(10) Patent No.: US 9,234,789 B2
(45) Date of Patent: Jan. 12, 2016

(54) OPTICAL SENSING FRAME AND DISPLAY DEVICE THEREWITH

(75) Inventors: Wan-Sik Lim, Gyeongbuk (KR); Jang-Hwan Kim, Gumi-si (KR); Jae-Hwan Kim, Gumi-si (KR); Jin-Hyuk Jang, Daegu (KR); Woo-Nam Tak, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 1121 days.

(21) Appl. No.: 13/276,018

(22) Filed: Oct. 18, 2011

(65) Prior Publication Data

US 2012/0092647 A1 Apr. 19, 2012

(30) Foreign Application Priority Data

Oct. 19, 2010 (KR) .................. 10-2010-0101938

(51) Int. Cl.
 *G01J 1/04* (2006.01)
 *G01J 1/02* (2006.01)
 *G01J 1/42* (2006.01)
 *G06F 3/042* (2006.01)

(52) U.S. Cl.
 CPC .............. *G01J 1/0271* (2013.01); *G01J 1/0403* (2013.01); *G01J 1/4228* (2013.01); *G01J 1/42* (2013.01); *G06F 3/0421* (2013.01)

(58) Field of Classification Search
 CPC ......... G01J 1/42; G01J 1/0403; G01J 1/4228; G01J 1/0271
 USPC ...................................................... 250/338.1
 See application file for complete search history.

(56) References Cited

U.S. PATENT DOCUMENTS

| 6,828,959 | B2  | 12/2004 | Takekawa et al. |
|-----------|-----|---------|-----------------|
| 8,319,729 | B2  | 11/2012 | Choi et al. |
| 2001/0022579 | A1 | 9/2001 | Hirabayashi |
| 2004/0149892 | A1* | 8/2004 | Akitt ............... G06F 3/0428 250/221 |
| 2013/0106789 | A1* | 5/2013 | Hwang .................. 345/175 |

FOREIGN PATENT DOCUMENTS

| CN | 101191933 A | 6/2008 |
| CN | 101566746 A | 10/2009 |
| CN | 201522696 U | 7/2010 |
| KR | 10-2009-0112200 A | 10/2009 |
| KR | 10-2010-0070870 A | 6/2010 |

* cited by examiner

*Primary Examiner* — David Porta
*Assistant Examiner* — Carolyn Igyarto
(74) *Attorney, Agent, or Firm* — Birch, Stewart, Kolasch & Birch, LLP

(57) ABSTRACT

The present invention relates to display devices, and more particularly to an optical sensing frame in which an infrared sensor module is fastened to a case top with a bracket to secure an assembly margin and prevent the infrared sensor module from mismatching with a liquid crystal display module by relative movement; and a display device therewith, the optical sensing frame includes a case top having a frame shaped upper side, and sides bent and extended from four sides of the upper side perpendicular thereto, first to third brackets fastened to an inside of the upper side of the case top at three corners thereof respectively, and an infrared sensor module placed in each of the first to third brackets.

25 Claims, 13 Drawing Sheets

OPTICAL SENSING FRAME AND DISPLAY DEVICE THEREWITH

CROSS REFERENCE TO RELATED APPLICATION

This application claims the priority benefit of the Korean Patent Application No. 10-2010-0101938, filed on Oct. 19, 2010, which is hereby incorporated by reference as if fully set forth herein.

BACKGROUND OF THE DISCLOSURE

1. Field of the Disclosure

The present invention relates to display devices, and more particularly to an optical sensing frame in which an infrared sensor module is fastened to a case top with a bracket to secure an assembly margin and prevent the infrared sensor module from mismatching with a liquid crystal display module by relative movement; and a display device therewith.

2. Discussion of the Related Art

In general, a touch screen, one of interface types between a user and an information and communication device which uses various kinds of displays, is an input unit which enables interface with the device by touching a screen with a hand or a pen, personally.

Being a device that can be used by any one only by touching a button displayed on a display device with a finger, handling the touch screen conversationally and intuitively, the touch screen is applied to many fields, such as issuing machines in banks and public agencies, different medical apparatuses, tour and major facility guidance and traffic guidance.

In the touch screen, there are resistive type, capacitive type, ultrasonic wave type, infrared type, and so on depending on methods of perception.

Though above types have advantages different from one another, recently, the infrared type touch screen is paid attention owing to a minimized pressure applied thereto, and convenience of arrangement.

A related art infrared type touch screen assembly will be described with reference to the attached drawing.

FIG. 1 illustrates a perspective view of a related art touch screen assembly.

Referring to FIG. 1, the related art touch screen assembly is provided with a special purpose fastening device 15 for fastening the infrared sensor module to an upper side of a finished liquid crystal display module 30.

The touch screen assembly has a touch input region including toughened glass 25 on an underside of the fastening device 15 which holds the infrared sensor module that is not fastened to the liquid crystal display module 30. That is, the toughened glass 25 is positioned on the liquid crystal display module 30, and the toughened glass 25 serves as a touch surface. In this instance, the toughened glass 25 is coupled to the liquid crystal display module 30 such that an underside of the toughened glass 25 is in contact with an upper surface of a case top of the liquid crystal display module 30.

In the meantime, the liquid crystal display module 30 has a liquid crystal panel and underlying optical sheets and a backlight unit fastened at edges and an underside thereof by the case top and a bottom cover.

In this case, a liquid crystal display device with the infrared type touch screen assembly has a problem in that making the liquid crystal display device with the infrared type touch screen assembly more slimmer is impossible due to a thickness thereof greater than a sum of thicknesses of the fastening device 15 which holds the infrared sensor module, the toughened glass 25, and the liquid crystal display module 30.

And, the related art infrared type touch screen assembly is required to have a step for fastening and securing the touch screen assembly to the liquid crystal display module after the touch screen assembly is fabricated individually, and in order to implement a touch, assembly of components and matching coordinates of the liquid crystal panel and the touch screen assembly is required.

The related art infrared type touch screen assembly has the following problems.

First, a touch detecting can be made available only when the touch screen assembly and liquid crystal display module fabricated individually are coupled after the touch screen assembly and liquid crystal display module are fastened with respective fastening devices. And, since the toughened glass is required to be positioned between the touch screen assembly and the liquid crystal display module for protecting the liquid crystal display module from the fastening device of the touch screen assembly, the liquid crystal display device becomes thicker and heavier.

Second, reflection at the toughened glass which is used as the touch surface makes brightness of the liquid crystal panel poor, and reflection of room lighting is visible on the touch screen.

Third, the individual fabrication of the touch screen assembly and liquid crystal display module can cause mismatch between the fastening device which holds the infrared sensor module and the underlying liquid crystal panel to cause touch detection impossible or touch sensitivity poor if the touch screen assembly and the liquid crystal display module move relative to each other during fabrication, assembly, transportation or use of a finished product.

SUMMARY OF THE DISCLOSURE

Accordingly, the present invention is directed to an optical sensing frame and a display device therewith.

An object of the present invention is to provide an optical sensing frame in which an infrared sensor module is fastened to a case top with a bracket to secure an assembly margin and prevent the infrared sensor module from mismatching with a liquid crystal display module by relative movement; and a display device therewith.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical sensing frame includes a case top having a frame shaped upper side, and sides bent and extended from four sides of the upper side perpendicular thereto, first to third brackets fastened to an inside of the upper side of the case top at three corners thereof respectively, and an infrared sensor module placed in each of the first to third brackets.

Each of the first to third brackets has the infrared sensor module placed therein such that the infrared sensor module faces a diagonal direction from a center of the corner on the inside of the upper side of the case top. In this instance, each of the first to third brackets includes a first body portion and a second body portion each opposite to a portion of one of adjacent two sides of the corner on the inside of the upper side of the case top, and a connection portion connected to the first body portion and the second body portion and engaged with the infrared sensor module at the center of the corner on the inside of the upper side of the case top. In this case, each of the first body portion and the second body portion has a length of 1~4 mm.

And, the first body portion and the second body portion further include projections to be fastened to a first hole and a second hole in the upper side of the case top, respectively. In this instance, the infrared sensor module further includes a projection to be fastened to a third hole in the upper side of the case top. The projections at the first body portion and the second body portion and the projection at the infrared sensor module have heights each smaller than a thickness of the upper side of the case top. In this case, each of the heights of the projections at the first body portion and the second body portion and the projection at the infrared sensor module is 50-95% of a thickness of the upper side of the case top.

The optical sensing frame further includes hardened sealant between the projections fastened to the first to third holes, respectively.

And, the optical sensing frame further includes a dummy bracket fastened to another corner on the inside of the upper side of the case top.

In the meantime, the dummy bracket and the case top are fastened by means of projections and holes.

And, the optical sensing frame further includes a guide structure arranged to be in contact with an inside of the side of the case top except the corners on the inside of upper side of the case top.

The optical sensing frame further includes a retro-reflective plate attached to a side of the guide structure not in contact with the case top.

The retro-reflective plate is attached to the sides of first and second body portion of the first to third brackets and the dummy bracket.

In this instance, it is preferable that the optical sensing frame further includes a step provided to the sides of first and second body portion of the first to third brackets and the dummy bracket for placing the retro-reflective plate thereon.

And, it is preferable that the guide structure is arranged spaced from the first to third brackets and the dummy bracket.

In another aspect of the present invention, a display device includes a display panel, a case top having a frame shaped upper side surrounding upper edges of the display panel, and sides bent and extended from four sides of the upper side perpendicular thereto, first to third brackets fastened to an inside of the upper side of the case top at three corners thereof respectively, and an infrared sensor module placed in each of the first to third brackets matched to the three corners on the upper side of the display panel.

Each of the first to third brackets includes a first body portion and a second body portion each opposite to a portion of one of adjacent two sides of the corner on the inside of the upper side of the case top, and a connection portion connected to the first body portion and the second body portion and engaged with the infrared sensor module at the center of the corner on the inside of the upper side of the case top.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

In the following description, the optical sensing frame in accordance with a preferred embodiment of the present invention is a frame shaped device for sensing a light quantity by using an optical system, particularly an infrared ray. The optical sensing frame serves as a casing of a display panel, and is used for detection of a touch in association with a touch control unit and the display panel.

Figure 1:
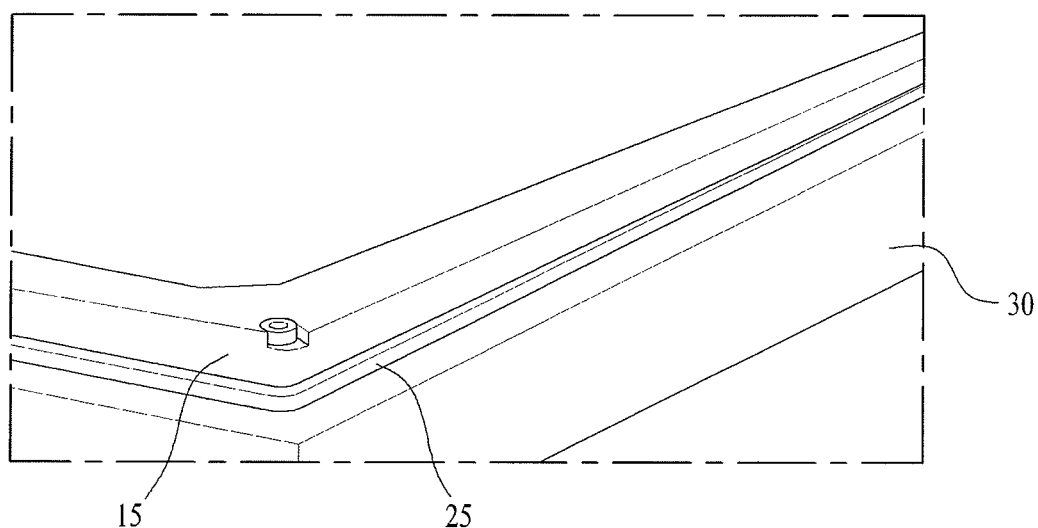
FIG. 1 illustrates a perspective view of a related art touch screen assembly.
Figure 2A:
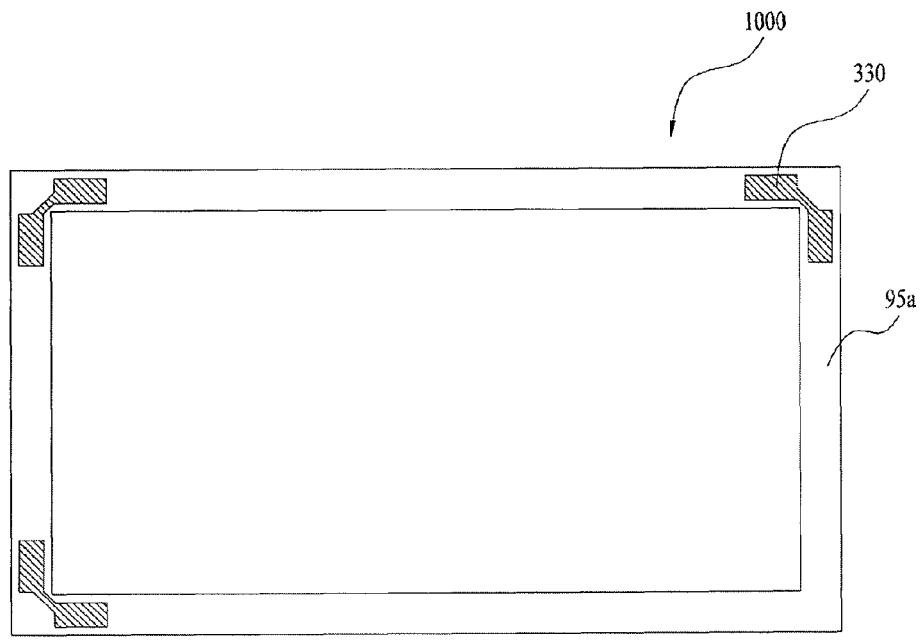
FIG. 2A illustrates a plan view of an optical sensing frame in accordance with a preferred embodiment of the present invention, showing brackets fastened to an inside of an upper side of a case top.
Figure 2B:
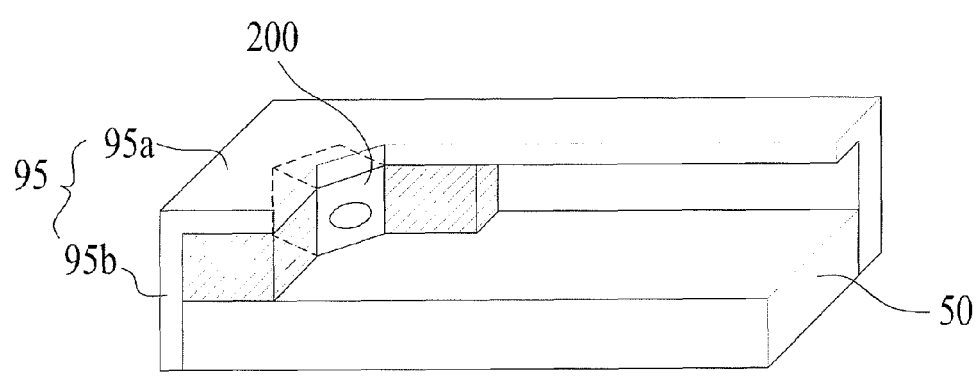
FIG. 2B illustrates a perspective view of an optical sensing frame assembled with a display panel.

FIG. 2A illustrates a plan view of an optical sensing frame in accordance with a preferred embodiment of the present invention, showing brackets fastened to an inside of an upper side of a case top, and FIG. 2B illustrates a perspective view of an optical sensing frame assembled with a display panel.

Referring to FIGS. 2A and 2B, the optical sensing frame 1000 includes a case top 95 having a frame shaped upper side 95a, and sides 95b each bent and extended from each side of the upper side 95a perpendicular thereto, first to third brackets 330 respectively coupled to insides of three corners of the upper side 95a of the case top 95, and an infrared sensor module 200 placed in each of first to third brackets 330.

In this instance, the bracket 330 provided for fastening the infrared sensor module 200 close to the case top 95 by using an additional fastening structure (For an example, a projection to be described later), to couple the infrared sensor module 200 to the case top 95, mechanically.

The brackets 330 and the infrared sensor modules 200 fastened thereto are respectively arranged at the three corners for prevention of a dead zone from forming, and for multiple touches. In this case, if an object present on a line which connects adjacent two infrared sensor modules, since a third infrared sensor module can detect an angle of the object from other angle, the dead zone does not take place. And, if two or more than two objects touch the display panel 50, since coordinates trigonometrically measured by each of a first sensor module pair of adjacent first and second infrared sensor modules and second sensor module pair of adjacent second and third infrared sensor modules can be compared to sort out and remove false images, multiple touch detection is possible.

Depending on cases, the bracket 330 and the infrared sensor module 200 can be arranged to all of the four corners.

And, if an additional false image algorithm is used, two infrared sensor modules 200 can be arranged to the corner of a flat display panel 50.

The case top 95 is a metallic element for covering edges and sides of the display panel 50. And, the case top 95 is rectangular frame to make an active region of the display panel 50 visible through an opened portion thereof, and the display panel 50 functions as a touch surface as well as a display surface.

In the meantime, an unexplained reference numeral 50 in FIG. 2B denotes the display panel, wherein the bracket 330 is placed on an outside of the active region of the display panel 50.

The optical sensing frame uses the infrared sensor modules 200 at corners each for sensing a light quantity of a region. And, the infrared sensor module 200 of the optical sensing frame is connected to a touch control unit with an FPC (Flexible Printed Cable) for enabling the touch control unit to detect whether the touch is made or not with reference to a change of the light quantity sensed thus.

And, the display panel 50 has opposite first substrate (Not shown) and second substrate (Not shown) bonded together with an intermediate layer (Not shown) disposed therebetween. The intermediate layer, variable with a driving principle of the display panel 50, can be an electrophoresis material, an organic luminescence material, a field emission material, a quantum dot, or vacuum, or air. And, according to constituent of the intermediate layer, the display panel 50 can be a liquid crystal display panel, an electrophoresis display panel, an organic luminescence display panel, a field emission display panel, a quantum dot display panel and a plasma display panel. And, besides those, the display panel 50 can be replaced with a display panel under development or to be developed in the future.

For an example, if the display panel 50 is the liquid crystal display panel, first and second polarizing plates are attached to a backside of the first and second substrates. In this case, it is preferable that the second polarizing plate in contact with the infrared sensor module 200 has a toughened surface for preventing the surface from damaging by contact with the infrared sensor module 200.

And, the optical sensing frame 1000 is coupled to the display panel 50 in a mode of covering upper edges and sides of the display panel 50. And, the optical sensing frame 1000 encases the display panel 50 together with the optical sheets (Not shown) or a light source under the display panel 50, and, when a touch takes place on the display panel 50, senses a change of a light quantity and transmits the change to the touch control unit (Not shown) for the touch control unit to detect whether a touch is made or not and a touched position.

In the meantime, the optical sensing frame 1000 is positioned at edges of the display panel 50 coupled to a support main (Not shown) which supports the edges of the display panel 50 to define a display module, and the display module is coupled to a bottom case (Not shown) which encases the edges and sides of the display module and an underside of the display panel or the display panel, the optical sheets and the light source to define the display device.

Figure 3:
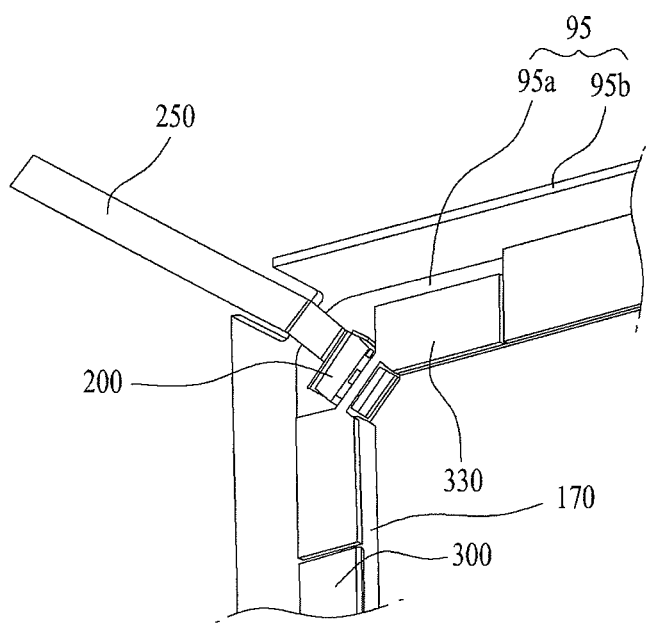
FIG. 3 illustrates a perspective view of an optical sensing frame corner seen from an inside of a case top.
Figure 4:
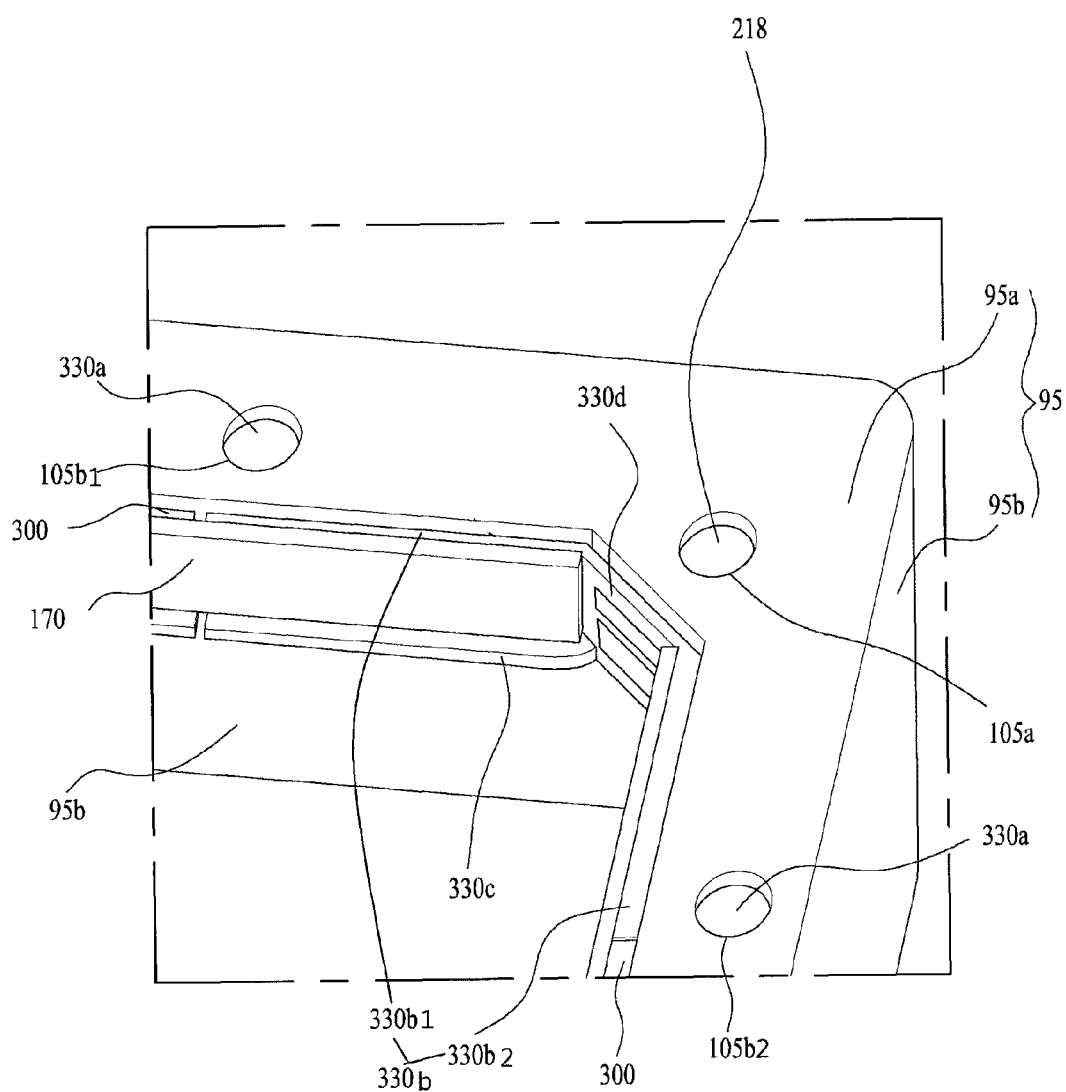
FIG. 4 illustrates a perspective view of an optical sensing frame corner seen from an outside of a case top.
Figure 5:
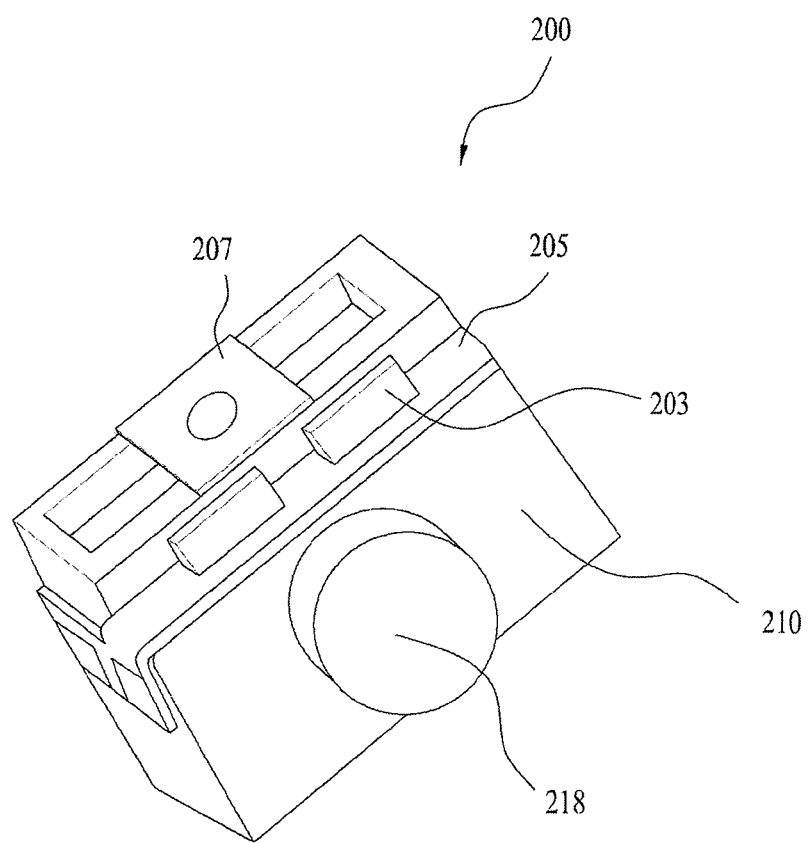
FIG. 5 illustrates a perspective view of an infrared sensor module of an optical sensing frame in accordance with a preferred embodiment of the present invention.

FIG. 3 illustrates a perspective view of an optical sensing frame corner seen from an inside of a case top, and FIG. 4 illustrates a perspective view of an optical sensing frame corner seen from an outside of a case top. And, FIG. 5 illustrates a perspective view of an infrared sensor module of an optical sensing frame in accordance with a preferred embodiment of the present invention, and FIG. 6 illustrates a perspective view of a bracket of an optical sensing frame in accordance with a preferred embodiment of the present invention.

Figure 6:
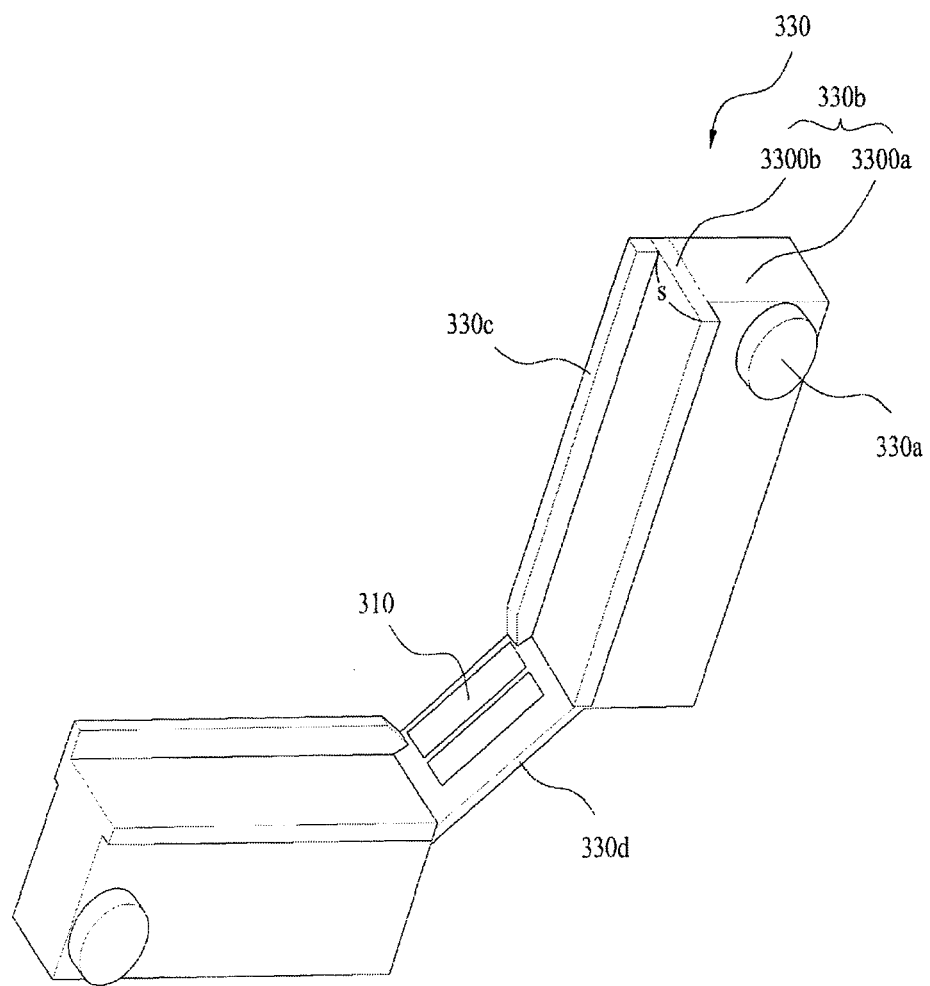
FIG. 6 illustrates a perspective view of a bracket of an optical sensing frame in accordance with a preferred embodiment of the present invention.

Referring to FIGS. 3, 4, and 6, the infrared sensor module 200 is placed in each of the first to third brackets 330 such that each of the first to third brackets 330 faces a diagonal direction from a center of an inside corner of the upper side 95a of the case top 95.

In this instance, each of the first to third brackets 330 includes a body portion 330b having a first body portion 330b1 and a second body portion 330b2 each opposite to a portion of one of adjacent two sides of the corner on the inside of the upper side 95a of the case top 95, and a connection portion 330d respectively connected to the first body portion 330b1 and the second body portion 330b2 and engaged with the infrared sensor module 200 at the center of the inside corner of the upper side 95a of the case top 95.

And, each of the body portions 330b has a flat portion 3300a in contact with an inside of the upper side 95a of the case top 95, and a side 3300b having a height higher than the flat portion 3300a in contact with a retro-reflective plate 170. And, the side 3300b can have a step 330c projected from a lower side thereof. In this instance, the step 330c is arranged to be in contact with, or spaced from, an upper side of the display panel (See 50 in FIG. 2B), and the retro-reflective plate 170 is placed on an upper side of the step 330c.

A height S obtained by subtracting a thickness of the step 330c from the side 3300b is the same with a height of the retro-reflective plate 170, and the side 3300b is in contact with the upper side 95a of the case top 95. By this, since the retro-reflective plate 170 can be formed even to an outer side of the upper side 95a of the case top 95, retro-reflection efficiency can be enhanced without making a height of the bracket 330 and the like higher.

Each of the body portions 330b has a length of 1~4 mm, and the connection portion 330 has a length the same with a length of a front (facing the diagonal direction) of the infrared sensor module 200.

In this instance, the connection portion 330d has a height and a width smaller than the first or second body portion 330b (330b1, 330b2). The height and width of the connection portion 330d are adequate as far as the infrared sensor module 200 can be placed between the connection portion 330d and the upper side 95a of the case top 95.

In the meantime, each of the first body portion 330b1 and the second body portion 330b2 has a projection 330a to be fastened to first hole 105b1 and second hole 105b2 in the upper side 95a of the case top 95 additionally for strengthening structural fastening between the case top 95 and the bracket 330.

And, in order to strengthening fastening to the case top 95 more, the infrared sensor module 200 has a projection 218 for fastening to a third hole 105a in the upper side 95a of the case top 95, additionally.

Each of heights of the projections 330a from the first and second body portions 330b and the projection 218 from the infrared sensor module is smaller than a thickness of the upper side 95a of the case top 95. In this case, each of the heights of the projections 330a from the first and second body portions 330a and the projection 218 from the infrared sensor module is 50~95% of the thickness of the upper side 95a of the case top 95. For an example, if the thickness of the upper side 95a of the case top is 1 mm, each of the heights of the projections 330a from the first and second body portions 330a and the projection 218 from the infrared sensor module can be 0.5~0.95 mm. More preferably, each of the heights of the projections 218 and 330a is 0.7~0.9 times of the thickness of the upper side 95a of the case top 95.

Sealant can be applied between the first to third holes 105b1, 105b2, and 105a and the projections 330a, 330a, and 218 fastened thereto and a UV beam is directed through the first to third holes 105b1, 105b2, and 105a in the case top 95 to harden the sealant. By this, the sealant hardened thus can enhance securing among the infrared sensor module 200, the bracket 330 and the case top 95.

In the meantime, referring to FIGS. 3 and 4, there is a guide structure 300 arranged to be in contact with an inside of the side 95b of the case top 95 except the inside corners of the upper side 95a of the case top 95.

The retro-reflective plate 170 is attached to a side of the guide structure 300 which is not in contact with the case top 95.

In this instance, the guide structure 300 and the bracket 330 are arranged spaced from each other for preventing tolerance of assembly or thermal shrinkage or expansion from taking place. Alike the bracket 330, the guide structure 300 has a step provided on a lower side thereof to arrange the retro-reflective plate 170 thereon. The retro-reflective plate 170 is placed on the steps attached to the sides of the guide structure 300 and the bracket 330 for retro-reflecting the light incident thereon from the infrared sensor module 200 on the display panel 50. An extent of projection of the steps of the guide structure 300 and the bracket 330 the retro-reflective plate 170 thereon from sides thereof is smaller than a thickness of the retro-reflective plate 170.

In this case, the space between the guide structure 300 and the bracket 330 is small below 1 mm. The retro-reflective plate 170 is attached to the sides of the guide structure 300 and the bracket 330 with an additional two sides tape (Not shown).

The bracket 330 has a 'ㄱ' shape with the first and second body portions 330b. In this instance, each of two sides of the 'ㄱ' shape is a portion of one of each of two adjacent sides of the corner of the upper side 95a of the case top 95 the infrared sensor module 200 is placed therein, and form an angle of 90° from each other. Accordingly, horizontal movement of the bracket 330 and the infrared sensor module 200 fastened to the bracket 330 is limited by the first and second body portions 330b, and vertical movement thereof is also limited by coupling of the projections of the brackets 330, the projection 218 of the infrared sensor module 200 to the first to third holes 105b1, 105b2, and 105a, and the hardened sealant.

If the bracket 330 is provided additionally in comparison to a structure in which the infrared sensor module 200 is fastened to the case top 95 directly, both the horizontal and vertical movement can be limited. According to this, a problem caused by misalignment of the infrared sensor module 200 with the corner of the case top due to relative movement taken place in assembly and after the assembly can be prevented.

As an example, problems of a structure in which the infrared sensor module 200 is fastened to the case top 95 directly without the bracket 330 will be reviewed.

First, it is required to attach the infrared sensor module which is small to a small area of the center of the inside corner of the upper side of the case top.

Second, the infrared sensor module can be positioned wrongly every time the infrared sensor module is attached due to damage of the projection at the top of the infrared sensor module by vibration or during assembly. A vertical direction position is also liable to become wrong.

Third, since the infrared sensor module is secured only in the vertical direction, the infrared sensor module is liable to turn if there is a relative movement. A horizontal reference is liable to misalign. That is, if the infrared sensor module having such a damaged projection can cause misalignment of a horizontal angle of view to fail detection of the touch or cause wrong detection.

Fourth, there are many cases when the projection of the infrared sensor module is damaged at the time the infrared sensor module is mounted to the case top, and if the infrared sensor module with the damaged projection is mounted to the case top, exact mounting of the infrared sensor module to a target position is failed.

Consequently, besides the top side projection of the infrared sensor module which serves to attach and secure the infrared sensor module to the case top vertically, additional means is required for solving a problem of a horizontal direction tolerance. In order to improve the horizontal misalignment and the vertical misalignment taking place when the infrared sensor module is mounted to the case top, the bracket 330 is provided.

And, an unexplained reference numeral 310 in FIG. 6 denotes infrared filters 310 positioned matched to an LED of the infrared sensor module and a photo sensor. The infrared filter 310 can be arranged individually matched to the LED and the photo sensor respectively positioned in up/down directions, or singly as one unit. The infrared filter 310 serves to remove lights except the infrared ray for receiving or emitting the infrared ray only among the lights received or emitted.

In the meantime, referring to FIGS. 3 to 5, the infrared sensor module 200 includes an infrared LED 203 for emitting an infrared ray, an LED PCB 205 for mounting the LED 203, a photo sensor (Not shown) for sensing a light focused by a lens, a housing 210 having the infrared LED PCB 205 placed thereon and the photo sensor arranged there under, and the lens 207 on the housing to face the photo sensor for collecting and transmitting a received light to the photo sensor. In this instance, a mask or/and cover glass can be provided on the lens for protecting the lens 207.

Though the infrared sensor module 200 in the drawing shows that the LED 203 is arranged on an upper side of the housing 210, and the photo sensor is arranged on a rear side of a lower side of the housing (Covered by the housing in the drawing), depending on cases, by positioning the LED 203 and the photo sensor on the same line, a height of the housing 210 can be reduced. And, by providing more lens and infrared filter on a light emitting side, light emitting efficiency of the infrared light of the LED 203 can be enhanced.

In this instance, the lens and the infrared filter of the LED 203, or the lens 207 on a photo sensor side, can be provided, not to the infrared sensor module 200, but to the bracket 330.

In the meantime, an unexplained reference numeral 250 in FIG. 3 denotes a flexible printed circuit FPC which is connected to the sensor of the infrared sensor module 200 for transmitting the light sensed at the sensor to the touch control unit (Not shown).

The infrared sensor module 200 has the LED 203 for emitting the light and a photo sensor (not shown, the photo sensor is positioned inside the lens 207) for sensing the light as basic elements, and other elements thereof can be changed, removed therefrom and added thereto.

And, the LED 203 emits an infrared ray horizontally in a range of 90° angle between adjacent first and second body portions of the bracket 330, and the photo sensor senses the light reflected at the retro-reflective plate 170 within the range of 90° angle. In this case, if there is the touch at a particular portion, the light quantity will become smaller at an angle of the touched portion, and by making trigonometric measurement of the angle at which the light quantity change takes place with each of the infrared sensor modules 200 respectively fastened to the first to third brackets 330, a position of the touch can be detected. In this case, the light quantity change can be detected by the infrared sensor module, and actual trigonometric measurement and the position detection based on the measurement can be performed by the touch control unit connected to the infrared sensor modules 200.

The guide structure 300 has a height lower than the height of the side 95b of the case top 95 enough to press down an edge of the display panel 50 placed under the guide structure 300. In this instance, as shown in FIG. 3, the guide structure 300 has a height similar to a height of the retro-reflective plate 170 except the step, and the bracket 330 also has a height equal or similar to the guide structure 300.

Figure 7:
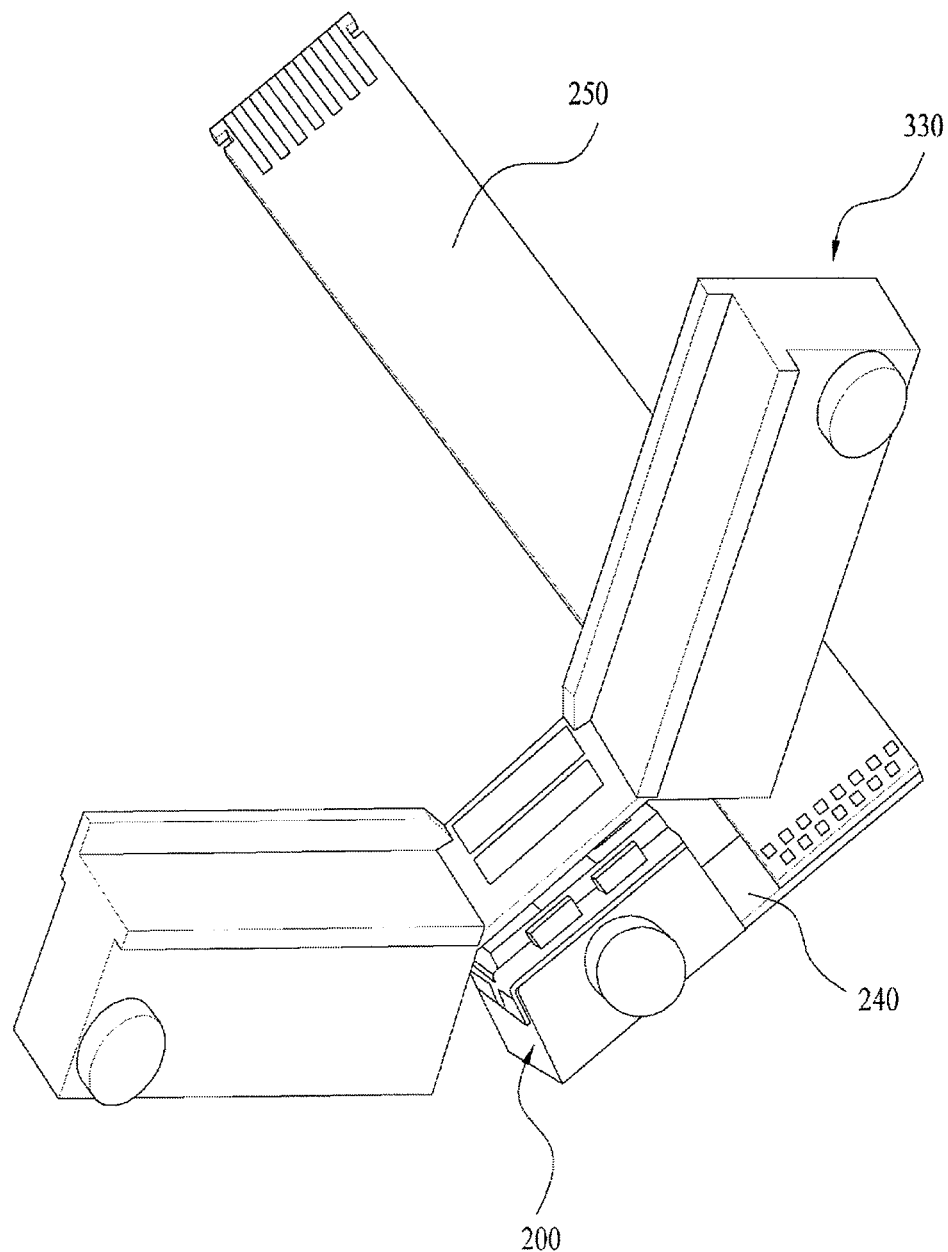
FIG. 7 illustrates a perspective view of a bracket an infrared sensor module of an optical sensing frame in accordance with a preferred embodiment of the present invention, coupled together.
Figure 8:
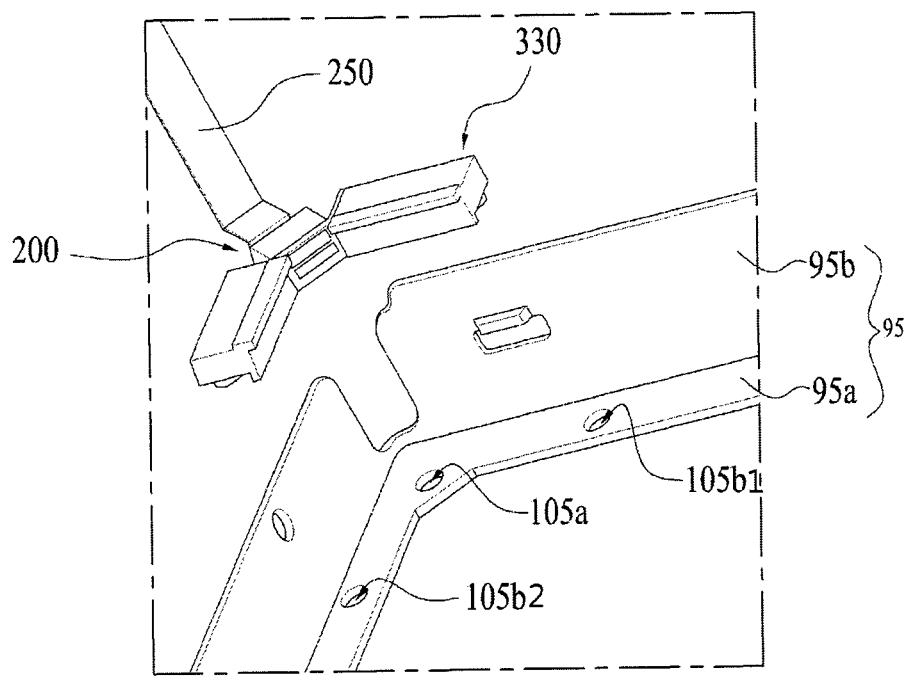
FIG. 8 illustrates a perspective view showing a bracket and an infrared sensor module of an optical sensing frame in accordance with a preferred embodiment of the present invention, coupled together to face an inside of a case top.

FIG. 7 illustrates a perspective view of a bracket an infrared sensor module of an optical sensing frame in accordance with a preferred embodiment of the present invention, coupled together, and FIG. 8 illustrates a perspective view showing a bracket and an infrared sensor module of an optical sensing frame in accordance with a preferred embodiment of the present invention, coupled together to face an inside of a case top.

Referring to FIGS. 7 and 8, the bracket 330 and the infrared sensor module 200 are fastened together, and the bracket 330 and the infrared sensor module 200 fastened together thus is fastened to an inside of the upper side 95a of the case top 95. In this instance, the case top 95 has the first to third holes 105b1, 105b2, and 105a matched to the projections 330a, 330a, and 218 at the first to second body portions of the bracket and the infrared sensor module 200.

And, the photo sensor in the infrared sensor module 200 is mounted to a small sized PCB 240 on a rear side of the housing 210 by an SMT (Surface Mounting Technology) connected to the FPC (Flexible Printed Cable) 250. In this case, the small sized PCB 240 can be omitted to mount the infrared sensor module 200 to the FPC 250, directly.

The FPC 250 is formed of a flexible material secured to the inside of the side of the case top 95, folded to a lower side of the bottom case (Not shown), and connected to the touch control unit at the rear side of the bottom case. In this instance, the FPC 250 is connected to the touch control unit at a shortest distance for each of the corners the infrared sensor module 200 is positioned.

And, the side of the case top 95 facing the corner can be opened as shown in FIG. 8 or closed as shown in FIG. 2B.

In the meantime, the steps of assembly of an optical sensing frame in accordance with a preferred embodiment of the present invention will be described.

FIGS. 9A-9E illustrate perspective views showing the steps of assembly of an optical sensing frame in accordance with a preferred embodiment of the present invention.

Figure 9A:
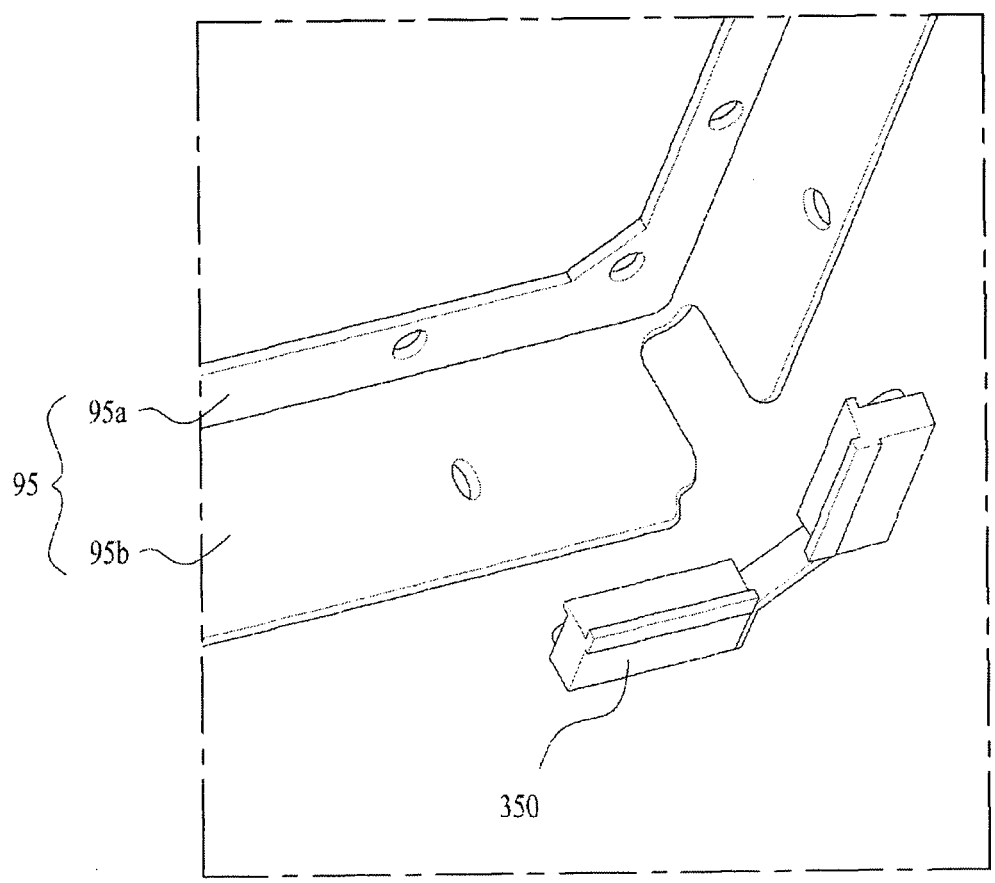
FIGS. 9A-9E illustrate perspective views showing the steps of assembly of an optical sensing frame in accordance with a preferred embodiment of the present invention.

Referring to FIG. 9A, a dummy bracket 350 having no infrared sensor module mounted thereto can be provided to a corner the bracket is not provided thereto. The dummy bracket 350 may or may not have the same shape with the bracket 330.

Depending on cases, the dummy bracket 350 can be omitted, and the guide structure at adjacent sides can be connected at the corner no bracket is provided thereto to form a '¬' shaped guide structure opposite to inside two sides of the upper side of the case top.

In any of the cases, the dummy bracket 350 or the guide structure has the retro-reflective plate attached to a side thereof.

And, the dummy bracket 350 also has the projection for fastening to the hole in the upper side of the case top 95.

Figure 9B:
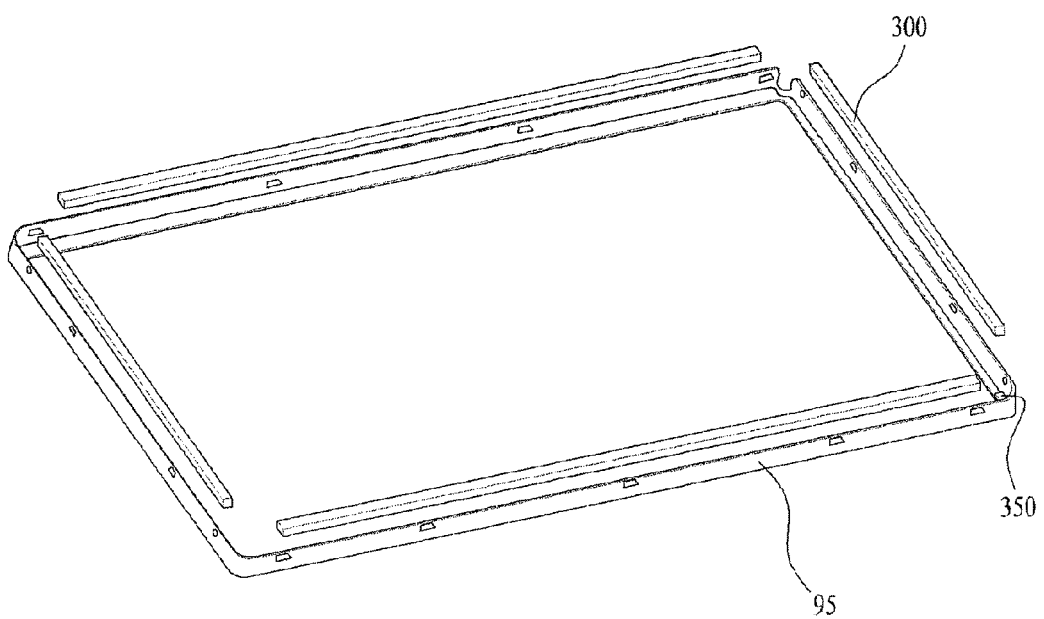

Referring to FIG. 9B, the guide structure 300 is arranged to insides of the upper side 95a and sides 95b of the case top 95. In this case, the guide structure 300 can be fastened to the case top 95 by attaching a two sided tape to a surface the upper side 95a and sides 95b of the case top 95 meet or with a fastening structure in which a projection or a hook or a projection and a recess meet.

Figure 9C:
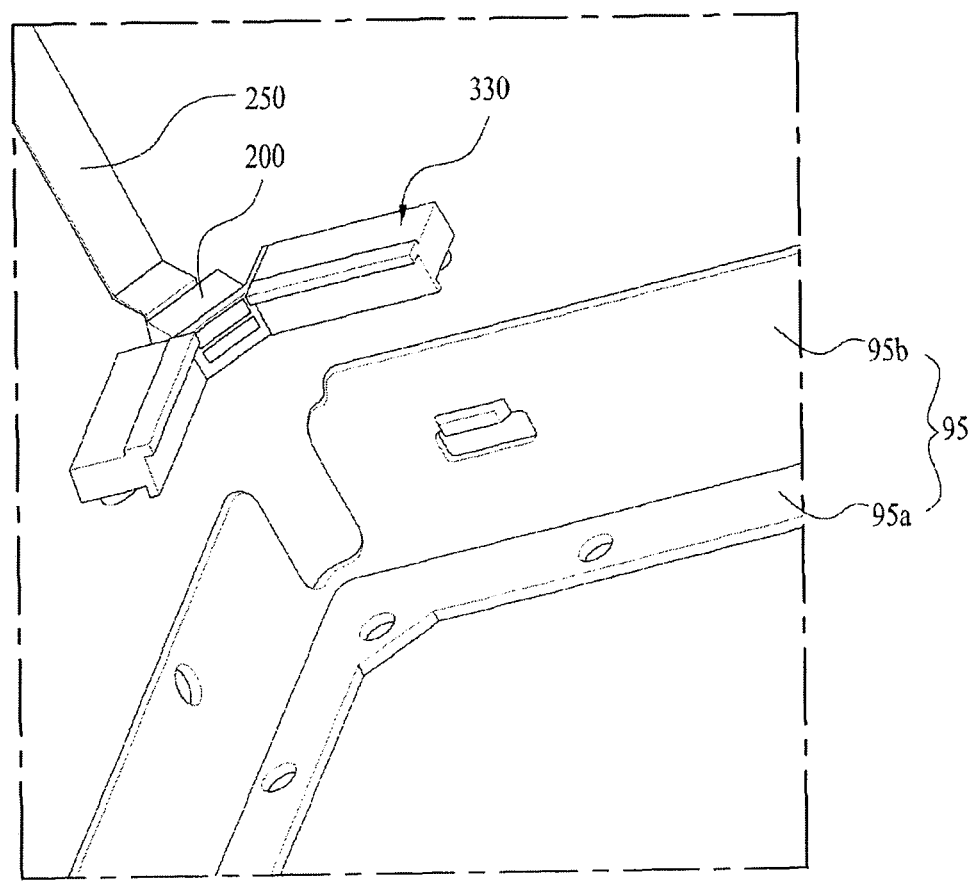

Referring to FIG. 9C, after fastening the infrared sensor module 200 having the FPC 250 and the photo sensor connected thereto to the bracket 330, the bracket 330 having the infrared sensor module 200 fastened thereto thus is fastened to an inside corner of the upper side 95a of the case top 95. As described before, the projections 330a, 330a, and 218 at the bracket 330 and the infrared sensor module 200 are placed in the first to third holes 105b1, 105b2, and 105a in the case top 95.

Figure 9D:
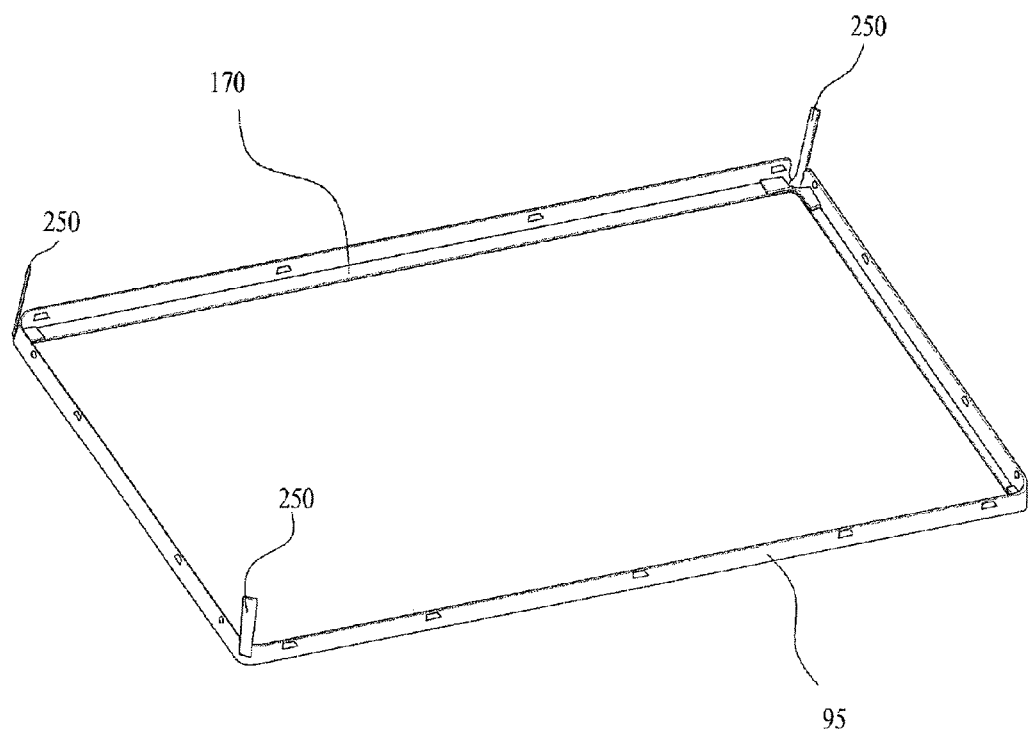

Then, referring to FIG. 9D, the retro-reflective plate 170 is attached to sides of the bracket 330, the dummy bracket 350, and the guide structure 300. The retro-reflective plate 170 is placed on lower side steps of the bracket 330, the dummy bracket 350, and the guide structure 300, and arranged to sides of the guide structure 300 and the bracket 330, for retro-reflecting of the light from the infrared sensor module 200. In this case, the dummy bracket 325 has no infrared sensor module mounted thereto, and the retro-reflective plate 170 is attached both to the body portion and the connection portion of the dummy bracket 325. According to this, the light incident on the dummy bracket 325 from the infrared sensor module 200 in a diagonal direction can be reflected without loss.

Figure 9E:
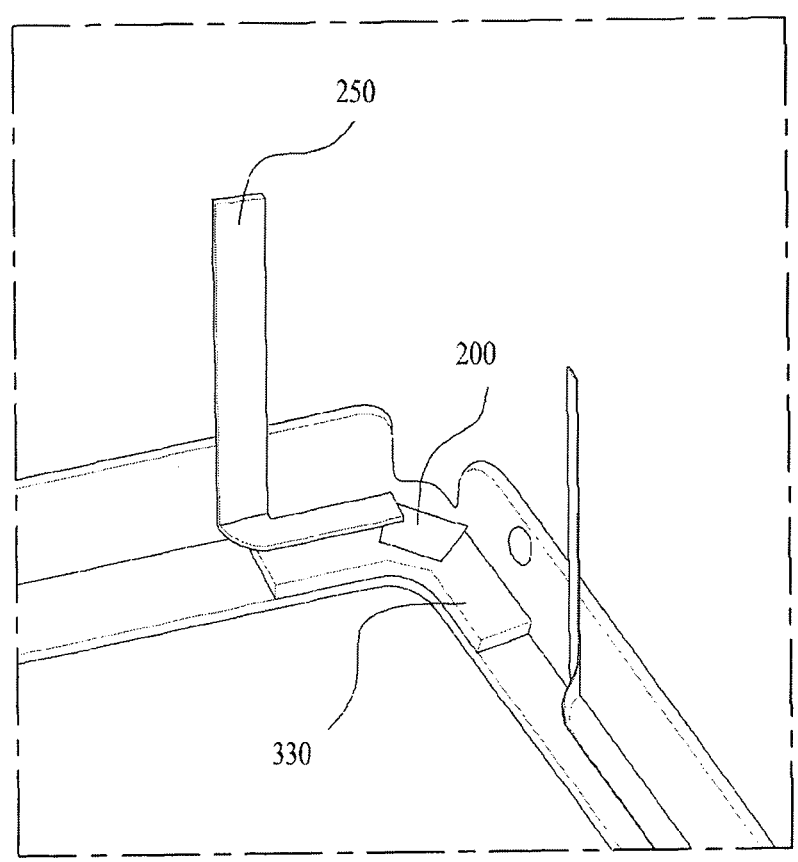

Referring to FIG. 9E, the FPC 250 of the infrared sensor module 200 is fixed to an inside of the side 95b of the case top 95. In this case, the FPC 250 is fixed at a position from which the FPC 250 can be connected to the touch control unit (Not shown) at a rear side of the bottom case at a shortest distance at the time the bottom case is placed to receive the display panel 50 together with the optical sensing frame 1000. Therefore, the position the FPC 250 is attached to the case top 95 can be adjusted according to a position of the touch control unit at the rear side of the bottom case.

As has been described, the optical sensing frame 1000 of the present invention permits to secure vertical and horizontal angle of views securely by applying the brackets 330 which fasten the infrared sensor modules 200 to insides of the case top 95 respectively that allows to secure assembly margin of the display device.

Especially, if only the infrared sensor module is fixed to the case top, since relative movement has been liable to take place both in up/down and left/right directions after the infrared sensor module is mounted to the case top, and correction of the relative movement has been difficult once it has taken place. And, in this case, though a method is used, in which a mark is made on the case top for attaching the infrared sensor module itself to the display panel, this method has difficulty in the step of matching the small camera module to a small corner of the display panel and, a tolerance range thereof varies among workers.

The optical sensing frame of the present invention permits to secure both the horizontal angle of view and the vertical angle of view of the infrared sensor module 200 by fastening the infrared sensor module to a portion of inside of each of the two sides of the case top 95 with the bracket 330 to prevent the infrared sensor module from moving both in up/down and left/right directions.

Thus, the optical sensing frame of the present invention uses a method in which the infrared sensor module 200 is mounted to the bracket 330 at first, and the bracket 330 having the infrared sensor module 200 mounted thus is mounted to the case top 95 by utilizing positioning holes in the case top 95. Eventually, since the optical sensing frame of the present invention can be assembled without variation of tolerance of the infrared sensor module, an assembly margin can be secured, and the horizontal and vertical angles of view can be made to be within a range of the specification.

As has been described, the optical sensing frame and the display device therewith of the present invention have the following advantages.

First, the optical sensing frame of the present invention permits to secure both the horizontal angle of view and the vertical angle of view of the infrared sensor module by fastening the infrared sensor module to a portion of inside of each of the two sides of the case top with the bracket to prevent the infrared sensor module from moving both in up/down and left/right directions.

Second, in the optical sensing frame which uses an optical touch, assemblability of the case top and the infra sensor module can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical sensing frame comprising:
   a case top having a frame shaped upper side, and sides bent and extended from four sides of the upper side perpendicular thereto;
   first to third brackets fastened to an inside of the upper side of the case top at three corners thereof, respectively; and
   an infrared sensor module placed in each of the first to third brackets.

2. The optical sensing frame as claimed in claim 1, wherein each of the first to third brackets has the infrared sensor module placed therein such that the infrared sensor module faces another corner in a diagonal direction from a center of one corner on the inside of the upper side of the case top.

3. The optical sensing frame as claimed in claim 2, wherein each of the first to third brackets includes;
   a first body portion and a second body portion each opposite to a portion of one of adjacent two sides of the corner on the inside of the upper side of the case top; and
   a connection portion connected to the first body portion and the second body portion and engaged with the infrared sensor module at the center of the corner on the inside of the upper side of the case top.

4. The optical sensing frame as claimed in claim 3, wherein each of the first body portion and the second body portion has a length of 1~4 mm.

5. The optical sensing frame as claimed in claim 3, wherein the first body portion and the second body portion further include projections to be fastened to a first hole and a second hole in the upper side of the case top, respectively.

6. The optical sensing frame as claimed in claim 5, wherein the infrared sensor module further includes a projection to be fastened to a third hole in the upper side of the case top.

7. The optical sensing frame as claimed in claim 6, wherein the projections at the first body portion and the second body portion and the projection at the infrared sensor module have heights each smaller than a thickness of the upper side of the case top.

8. The optical sensing frame as claimed in claim 7, wherein each of the heights of the projections at the first body portion and the second body portion and the projection at the infrared sensor module is 50~95% of a thickness of the upper side of the case top.

9. The optical sensing frame as claimed in claim 6, further comprising hardened sealant between the projections fastened to the first to third holes, respectively.

10. The optical sensing frame as claimed in claim 1, further comprising a dummy bracket fastened to another corner on the inside of the upper side of the case top.

11. The optical sensing frame as claimed in claim 10, wherein the dummy bracket and the case top are fastened by means of projections and holes.

12. The optical sensing frame as claimed in claim 11, further comprising a guide structure arranged to be in contact with an inside of the side of the case top except the corners on the inside of upper side of the case top.

13. The optical sensing frame as claimed in claim 12, further comprising a retro-reflective plate attached to a side of the guide structure not in contact with the case top.

14. The optical sensing frame as claimed in claim 13, wherein the retro-reflective plate is attached to the sides of first and second body portion of the first to third brackets and the dummy bracket.

15. The optical sensing frame as claimed in claim 14, further comprising a step provided to the sides of first and second body portion of the first to third brackets and the dummy bracket for placing the retro-reflective plate thereon.

16. The optical sensing frame as claimed in claim 12, wherein the guide structure is arranged spaced from the first to third brackets and the dummy bracket.

17. A display device comprising:
   a display panel;
   a case top having a frame shaped upper side surrounding upper edges of the display panel, and sides bent and extended from four sides of the upper side perpendicular thereto;
   first to third brackets fastened to an inside of the upper side of the case top at three corners thereof, respectively; and
   an infrared sensor module placed in each of the first to third brackets matched to the three corners on the upper side of the display panel.

18. The display device as claimed in claim 17, wherein each of the first to third brackets includes;
   a first body portion and a second body portion each opposite to a portion of one of adjacent two sides of the corner on the inside of the upper side of the case top; and
   a connection portion connected to the first body portion and the second body portion and engaged with the infrared sensor module at the center of the corner on the inside of the upper side of the case top.

19. The display device as claimed in claim 18, wherein the first body portion and the second body portion further include projections to be fastened to a first hole and a second hole in the upper side of the case top, respectively.

20. The display device as claimed in claim 18, wherein the infrared sensor module further includes a projection to be fastened to a third hole in the upper side of the case top.

21. The display device as claimed in claim 20, further comprising hardened sealant between the projections fastened to the first to third holes, respectively.

22. The display device as claimed in claim 17, further comprising a dummy bracket fastened to another corner on the inside of the upper side of the case top.

23. The display device as claimed in claim 22, further comprising a guide structure arranged to be in contact with an inside of the side of the case top except the corners on the inside of upper side of the case top.

24. The display device as claimed in claim 23, further comprising a retro-reflective plate attached to a side of the guide structure not in contact with the case top.

25. The display device as claimed in claim 23, wherein the guide structure is arranged spaced from the first to third brackets and the dummy bracket.

* * * * *